US012060456B2

(12) United States Patent
Sung et al.

(10) Patent No.: US 12,060,456 B2
(45) Date of Patent: Aug. 13, 2024

(54) POLYIMIDE PRECURSOR COMPOSITION AND POLYIMIDE FILM, SUBSTRATE FOR DISPLAY DEVICE, AND OPTICAL DEVICE PREPARED BY USING SAME

(71) Applicant: LG CHEM, LTD., Seoul (KR)

(72) Inventors: Jiyeon Sung, Daejeon (KR); Hoyong Lee, Daejeon (KR); Cheol Jun Song, Daejeon (KR); Kyunghwan Kim, Daejeon (KR); Mi Eun Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 840 days.

(21) Appl. No.: 17/059,997

(22) PCT Filed: Jan. 28, 2020

(86) PCT No.: PCT/KR2020/001291
§ 371 (c)(1),
(2) Date: Nov. 30, 2020

(87) PCT Pub. No.: WO2020/159193
PCT Pub. Date: Aug. 6, 2020

(65) Prior Publication Data
US 2021/0238351 A1 Aug. 5, 2021

(30) Foreign Application Priority Data

| Feb. 1, 2019 | (KR) | 10-2019-0013486 |
| Sep. 30, 2019 | (KR) | 10-2019-0121176 |
| Sep. 30, 2019 | (KR) | 10-2019-0121177 |
| Sep. 30, 2019 | (KR) | 10-2019-0121178 |
| Dec. 6, 2019 | (KR) | 10-2019-0161494 |
| Dec. 6, 2019 | (KR) | 10-2019-0161495 |

(51) Int. Cl.
*C08G 73/10* (2006.01)
*C08G 73/14* (2006.01)
*C08J 5/18* (2006.01)
*C08L 79/08* (2006.01)
*G02B 1/04* (2006.01)
*G02F 1/1333* (2006.01)

(52) U.S. Cl.
CPC ..... *C08G 73/1067* (2013.01); *C08G 73/1007* (2013.01); *C08G 73/1039* (2013.01); *C08G 73/1042* (2013.01); *C08G 73/1078* (2013.01); *C08G 73/1082* (2013.01); *C08G 73/14* (2013.01); *C08J 5/18* (2013.01); *C08L 79/08* (2013.01); *G02B 1/04* (2013.01); *G02F 1/133305* (2013.01); *C08J 2379/08* (2013.01); *C08L 2201/08* (2013.01); *C08L 2203/16* (2013.01); *C08L 2203/20* (2013.01); *C09K 2323/00* (2020.08); *C09K 2323/027* (2020.08); *G02F 2202/022* (2013.01)

(58) Field of Classification Search
CPC ..... C08J 5/18; C08J 2379/08; C08G 73/1042; C08L 79/08
See application file for complete search history.

(56) References Cited

U.S. PATENT DOCUMENTS

| 5,115,090 | A | 5/1992 | Sachdev et al. |
| 5,272,247 | A * | 12/1993 | Sotokawa ............ C08G 77/455 528/229 |
| 8,318,315 | B2 | 11/2012 | Yoo et al. |
| 10,144,847 | B2 | 12/2018 | Yun et al. |
| 10,647,883 | B2 | 5/2020 | Yun et al. |
| 2004/0087620 | A1 | 5/2004 | Tsuri et al. |
| 2014/0228512 | A1 | 8/2014 | Chou et al. |
| 2015/0011726 | A1 | 1/2015 | Hasegawa et al. |
| 2015/0158980 | A1 | 6/2015 | Oka et al. |
| 2017/0218200 | A1 | 8/2017 | Ahn et al. |
| 2019/0048141 | A1 | 2/2019 | Yun et al. |
| 2020/0062906 | A1 * | 2/2020 | Jeong ................. C08G 73/1039 |
| 2020/0095376 | A1 | 3/2020 | Yun et al. |

FOREIGN PATENT DOCUMENTS

| CN | 103319714 A | 9/2013 |
| CN | 104508009 A | 4/2015 |
| CN | 108026273 A | 5/2018 |
| CN | 108431088 A | 8/2018 |
| CN | 108699242 A | 10/2018 |
| CN | 108864426 A | 11/2018 |
| JP | S60-221426 A | 11/1985 |
| JP | H04-077587 A | 3/1992 |
| JP | H04-224824 A | 8/1992 |
| JP | H05-065342 A | 3/1993 |
| JP | H05-112644 A | 5/1993 |

(Continued)

OTHER PUBLICATIONS

International Search Report for PCT/KR2020/001291 dated May 21, 2020, 4 pages.
International Search Report for PCT/KR2020/001263 dated May 21, 2020, 4 pages.
International Search Report for PCT/KR2020/001250 dated May 8, 2020, 4 pages.
International Search Report for PCT/KR2020/001265 dated May 8, 2020, 4 pages.

*Primary Examiner* — Gregory Listvoyb
(74) *Attorney, Agent, or Firm* — ROTHWELL, FIGG, ERNST & MANBECK, P.C.

(57) ABSTRACT

The present disclosure provides a polyimide film having improved heat resistance and refractive index by using a polyimide precursor composition comprising a diamine of Chemical Formula 1 and an acid dianhydride of Chemical Formula 2 as polymerization components, thereby reducing the difference in refractive index from the upper layer to improve bottom emission efficiency.

14 Claims, No Drawings

(56) References Cited

FOREIGN PATENT DOCUMENTS

| | | |
|---|---|---|
| JP | H11-236448 A | 8/1999 |
| JP | 2005-306983 A | 11/2005 |
| JP | 2010-235641 A | 10/2010 |
| JP | 2013-001899 A | 1/2013 |
| JP | 2013-069505 A | 4/2013 |
| JP | 2013-137334 A | 7/2013 |
| JP | 2014077091 A | 5/2014 |
| JP | 2016-120629 A | 7/2016 |
| JP | 2017133012 A | 8/2017 |
| JP | 2019-503412 A | 2/2019 |
| KR | 10-2009-0066399 A | 6/2009 |
| KR | 10-1545666 B1 | 8/2015 |
| KR | 10-2016-0097682 A | 8/2016 |
| KR | 10-2016-0138980 A | 12/2016 |
| KR | 20160147837 A | 12/2016 |
| KR | 10-2017-0076101 A | 7/2017 |
| KR | 10-20170114366 A | 10/2017 |
| KR | 10-2017-0131514 A | 11/2017 |
| KR | 10-1796875 B1 | 11/2017 |
| KR | 10-2018-0032787 A | 4/2018 |
| KR | 10-2018-0033739 A | 4/2018 |
| KR | 10-2018-0048605 A | 5/2018 |
| KR | 10-2018-0081434 A | 7/2018 |
| KR | 10-2018-0096151 A | 8/2018 |
| KR | WO 2018143588 * | 8/2018 |
| KR | 10-2018-0110632 A | 10/2018 |
| KR | 10-2019-0038268 A | 4/2019 |
| TW | 201345952 A | 11/2013 |
| TW | 201431907 A | 8/2014 |
| TW | 201718714 A | 6/2017 |
| TW | 201813992 A | 4/2018 |
| WO | 2002-057216 A1 | 7/2002 |
| WO | 2013-154141 A1 | 10/2013 |
| WO | 2015-152178 A1 | 10/2015 |
| WO | 2016-088641 A1 | 6/2016 |
| WO | 2017-111300 A1 | 6/2017 |
| WO | 2018-056573 A1 | 3/2018 |
| WO | 2018-070398 A1 | 4/2018 |
| WO | 2018-097143 A1 | 5/2018 |

* cited by examiner

POLYIMIDE PRECURSOR COMPOSITION AND POLYIMIDE FILM, SUBSTRATE FOR DISPLAY DEVICE, AND OPTICAL DEVICE PREPARED BY USING SAME

CROSS-REFERENCE TO RELATED APPLICATION(S)

This application is a 35 U.S.C. 371 National Phase Entry Application from PCT/KR2020/001291, filed on Jan. 28, 2020, designating the United States, which claims the benefit of priority from Korean Patent Application No. 10-2019-0013486 filed on Feb. 1, 2019; Korean Patent Application No. 10-2019-0121176 filed on Sep. 30, 2019; Korean Patent Application No. 10-2019-0121177 filed on Sep. 30, 2019; Korean Patent Application No. 10-2019-0121178 filed on Sep. 30, 2019; Korean Patent Application No. 10-2019-0161494 filed on Dec. 6, 2019; and Korean Patent Application No. 10-2019-0161495 filed on Dec. 6, 2019 in the Korean Intellectual Property Office, the disclosures of which are incorporated herein by reference in their entirety.

TECHNICAL FIELD

The present disclosure relates to a polyimide precursor composition and a polyimide film prepared therefrom, a substrate for a display device, and an optical device, and more particularly, to a polyimide film having improved refractive index.

BACKGROUND OF THE INVENTION

The display device market is rapidly changing based on flat panel displays (FPDs) that are easy to fabricate over a large area and can be reduced in thickness and weight. Such flat panel displays include liquid crystal displays (LCDs), organic light emitting displays (OLEDs), or electrophoretic devices.

In line with recent efforts to further extend the application and use of flat panel displays, particular attention has focused on so-called flexible display devices in which flexible substrates are applied to flat panel displays. The application of such flexible display devices is particularly reviewed based on mobile devices such as smart phones and the application fields thereof are gradually extended.

In general, in manufacturing a flexible display device and an illumination device, a TFT device is manufactured by forming a multilayer inorganic film such as a buffer layer, an active layer, and a gate insulator on the cured polyimide.

However, when light is emitted to the polyimide layer (substrate layer), the emission efficiency may be reduced due to the difference between the refractive index of the multilayer upper layer made of the inorganic film and the refractive index of the polyimide layer.

BRIEF SUMMARY OF THE INVENTION

The present disclosure provides a polyimide precursor composition for producing a polyimide film with improved refractive index.

The present disclosure also provides a polyimide film prepared using the polyimide precursor composition.

The present disclosure further provides a substrate for display device and an optical device including the polyimide film, and its preparation process.

There is provided a polyimide precursor composition comprising, as polymerization components, one or more diamines including a diamine of the following Chemical Formula 1; and one or more acid dianhydrides including a tetracarboxylic dianhydride of the following Chemical Formula 2.

[Chemical Formula 1]

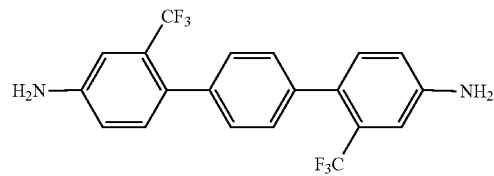

[Chemical Formula 2]

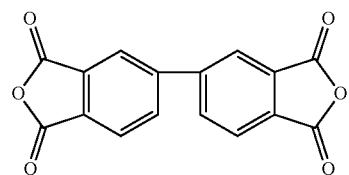

According to one embodiment, the polymerization component may further include a diamine of the following Chemical Formula 4.

[Chemical Formula 4]

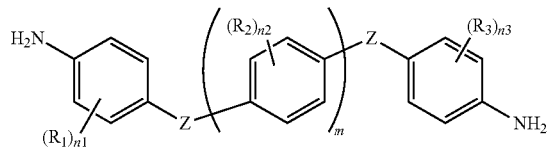

in Chemical Formula 4, each Z is independently one selected among —CONH, —NHCO—, —C(=O)O— and —OC(=O), $R_1$, $R_2$ and $R_3$ are each independently selected among a substituted or unsubstituted alkyl group having 1 to 10 carbon atoms, a haloalkyl group having 1 to 10 carbon atoms, an alkenyl group having 2 to 10 carbon atoms and an aryl group having 6 to 18 carbon atoms, n1, n2 and n3 are each independently an integer of 0 to 4, and m is an integer of 1 to 3.

According to one embodiment, the diamine of Chemical Formula 1 may be included in an amount of 70 mol % or more with respect to the total content of the diamine.

According to one embodiment, the tetracarboxylic dianhydride of Chemical Formula 2 may be included in an amount of 70 mol % or more with respect to the total content of the acid dianhydride.

According to one embodiment, the polyamic acid included in the polyimide precursor composition may include 70 mol % or more of a repeating structure of Chemical Formula 3 in the entire repeating structure.

[Chemical Formula 3]

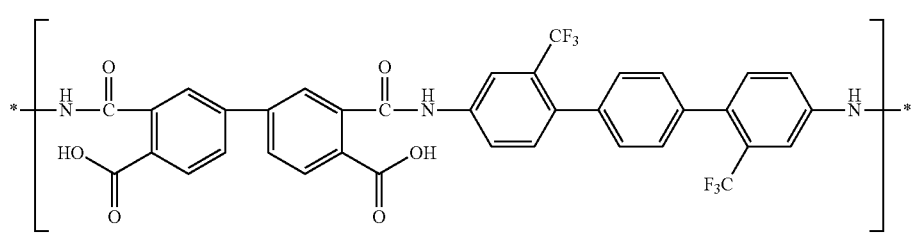

According to one embodiment, the diamine of Chemical Formula 4 may be included in an amount of 0 mol % to 30 mol % with respect to the total content of the diamine.

According to one embodiment, the polyamic acid included in the polyimide precursor composition may include a repeating structure of the following Chemical Formula 5.

[Chemical Formula 5]

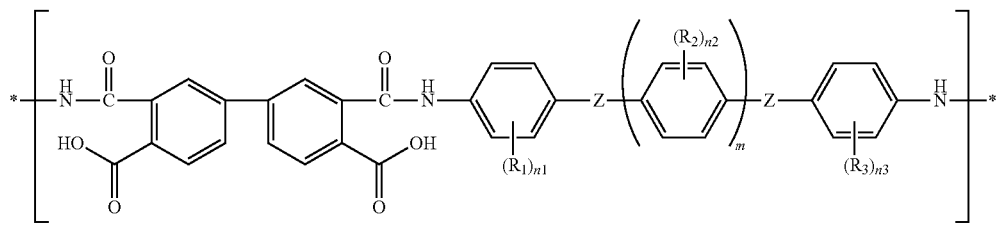

in Chemical Formula 5,
each Z is independently one selected among —CONH—, —NHCO—, —C(=O)O— and —OC(=O),
$R_1$, $R_2$ and $R_3$ are each independently selected among a substituted or unsubstituted alkyl group having 1 to 10 carbon atoms, a haloalkyl group having 1 to 10 carbon atoms, an alkenyl group having 2 to 10 carbon atoms and an aryl group having 6 to 18 carbon atoms,
n1, n2 and n3 are each independently an integer of 0 to 4, and
m is an integer of 1 to 3.

In order to achieve the other objects, there is provided a polyimide film including a cured product of the polyimide precursor composition.

According to one embodiment, the polyimide film can be prepared by a method including the steps of:
coating the polyimide precursor composition onto a carrier substrate; and
heating and curing the coated polyimide precursor composition.

According to one embodiment, the polyimide film may have a refractive index in the in-plane direction of 1.75 or more at a wavelength of 532 nm.

According to one embodiment, the polyimide film may have a Td_1% of 540° C. or more and a CTE of −50 ppm/° C. to 50 ppm/° C.

According to yet another embodiment, there is provided a substrate for display device including the polyimide film.

According to a further embodiment, there is provided an optical device including the polyimide film.

Advantageous Effects

According to the present disclosure, there can be provided a polyimide film having improved heat resistance and refractive index from a polyimide precursor composition including a diamine of Chemical Formula 1 and an acid dianhydride of Chemical Formula 2 as a polymerization component, whereby the difference in the refractive index from the upper layer can be reduced, and the bottom emission efficiency can be improved.

Since various modifications and variations can be made to the present disclosure, specific embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present disclosure, a detailed description of known functions will be omitted if it is determined that it may make the subject matter of the invention unclear.

In the present disclosure, all compounds or organic groups may be substituted or unsubstituted, unless otherwise specified. Herein, the term "substituted" means that at least one hydrogen contained in the compound or the organic group is substituted with a substituent selected from the group consisting of a halogen atom, an alkyl group having 1 to 10 carbon atoms, a halogenated alkyl group, a cycloalkyl group having 3 to 30 carbon atoms, an aryl group having 6 to 30 carbon atoms, a hydroxyl group, an alkoxy group having 1 to 10 carbon atoms, a carboxylic group, an aldehyde group, an epoxy group, a cyano group, a nitro group, an amino group, a sulfonic group or a derivative thereof.

In the flexible display including a polyimide film as a substrate layer, a TFT device is manufactured by forming a film made of a multilayer inorganic film such as a buffer layer, an active layer, and a gate insulator on a cured polyimide film in manufacturing a device or a lighting device.

Generally, in the case of a highly transparent polyimide film, the refractive index is n=1.65 or less, but when light is emitted to the polyimide layer, the emission efficiency can be reduced due to the difference between the refractive index of the upper layer including the inorganic film (n=1.8 or more) and the refractive index of the polyimide layer.

Therefore, in order to increase the efficiency of bottom emission from the flexible display device to the substrate layer, a device configuration that reduces the amount of light internally dissipated by reducing the difference in refractive index between the configured respective layers is needed.

In order to solve the problems of the prior art as described above, one embodiment of the present disclosure provides a polyimide precursor composition comprising, as polymerization components, one or more diamines including a diamine of the following Chemical Formula 1; and one or more acid dianhydrides including a tetracarboxylic dianhydride of the following Chemical Formula 2.

[Chemical Formula 1]

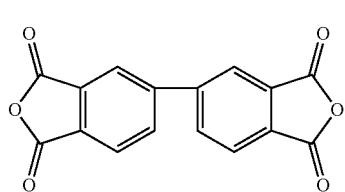

[Chemical Formula 2]

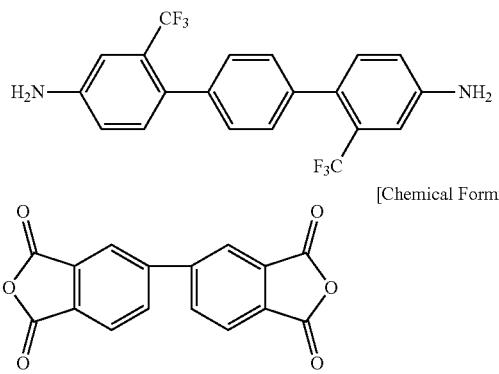

In Chemical Formula 1, the substituent containing fluorine (F) may reduce the packing in the polyimide structure or between the chains, and weaken chromogenic and electrical interactions owing to steric hindrance and electrical effects, and thus exhibit high transparency in the visible light region.

According to one embodiment, the diamine of Chemical Formula 1 may be included in an amount of 70 mol % or more, or 80 mol % or more, or 90 mol % or more with respect to the total content of the entire diamine in the polymerization component.

According to one embodiment, the acid dianhydride of Chemical Formula 2 may be included in an amount of 70 mol % or more, or 80 mol % or more, or 90 mol % or more with respect to the total content of the entire acid dianhydride in the polymerization component.

Alternatively, the polyimide precursor may include the repeating structure of Chemical Formula 3, which is formed from the diamine of Chemical Formula 1 and the acid anhydride of Chemical Formula 2 in the repeating structure of the polyamic acid, in an amount of 70 mol % or more, or 80 mol % or more with respect to the entire repeating structure of the polyamic acid.

[Chemical Formula 3]

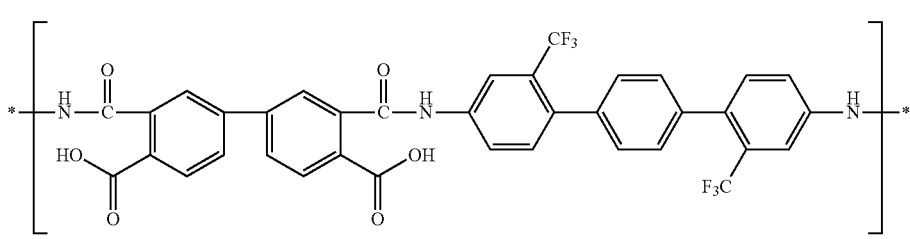

Further, by using the acid dianhydride of Chemical Formula 2 together with the diamine of Chemical Formula 1 as the polymerization components, it is possible to obtain a polyimide structure including a rigid repeating structure. From this, by improving and inducing the orientation and ordering between polyimide molecules, it is possible to improve the refractive index in the in-plane direction and in the thickness direction.

In the polyimide prepared from the polyimide precursor composition according to the present disclosure, the refractive index can be increased by about 0.01 to 0.1 compared to the polyimide without adding the organic filler including the monomolecular compound. Alternatively, the refractive index may be improved by 0.01 to 0.05.

The polyimide precursor according to the present disclosure may further include a diamine having a structure of Chemical Formula 4 as a polymerization component.

[Chemical Formula 4]

$$H_2N \underset{(R_1)_{n1}}{\underbrace{\phantom{XXX}}} Z \underset{(R_2)_{n2}}{\underbrace{\phantom{XXX}}}_m Z \underset{(R_3)_{n3}}{\underbrace{\phantom{XXX}}} NH_2$$

in Chemical Formula 4, each Z is independently one selected among —CONH—, —NHCO—, —C(=O)O— and —OC(=O), $R_1$, $R_2$ and $R_3$ are each independently selected among a substituted or unsubstituted alkyl group having 1 to 10 carbon atoms, a haloalkyl group having 1 to 10 carbon atoms, an alkenyl group having 2 to 10 carbon atoms and an aryl group having 6 to 18 carbon atoms, n1, n2 and n3 are each independently an integer of 0 to 4, and m is an integer of 1 to 3.

According to one embodiment, the diamine of Chemical Formula 4 may be included in an amount of more than 0 and 30 mol % or less, 20 mol % or less, or 10 mol % or less with respect to the total content of the diamine.

Alternatively, the polyimide precursor may include a repeating structure of Chemical Formula 5 in the repeating structure of the polyamic acid, in an amount of more than 0 and 30 mol % or less, or 20 mol % or less, or 10 mol % or less with respect to the total repeating structure of the polyamic acid.

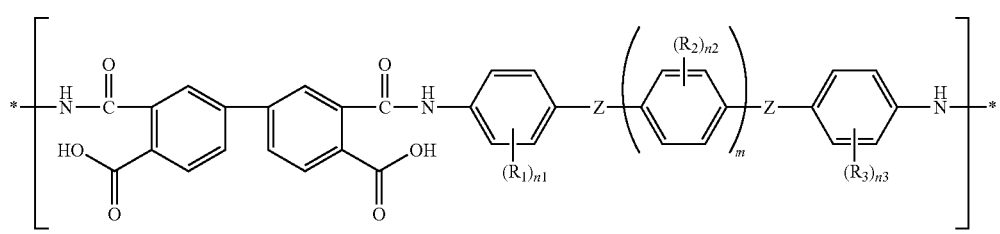

[Chemical Formula 5]

wherein, Z, $R_1$, $R_2$, $R_3$, n1, n2, and n3 are the same as defined in Chemical Formula 4.

The present disclosure can further improve the mechanical properties (modulus and elongation), adhesion, refractive index, in particular, the refractive index in the in-plane direction of the polyimide film by using a diamine having the structure of Chemical Formula 4 together with Chemical Formula 1 and Chemical Formula 2.

The polyimide precursor according to the present disclosure may further include one or more diamines and one or more tetracarboxylic dianhydrides as polymerization components, in addition to the diamine of Chemical Formula 1 and the acid dianhydride of Chemical Formula 2.

The tetracarboxylic dianhydride is an intramolecular aromatic, alicyclic, or aliphatic tetravalent organic group, or combination thereof, which may be a tetracarboxylic dianhydride including a tetravalent organic group in which the aliphatic, alicyclic or aromatic tetravalent organic group is linked to each other via a crosslinking structure. Alternatively, acid dianhydrides having monocyclic or polycyclic aromatic, monocyclic or polycyclic alicyclic structures, or structures in which two or more of them are linked by a single bond or a functional group may be used. Alternatively, it may be selected from tetravalent organic groups having rigid structures such as an aromatic, alicyclic ring structure alone, a fused heterocyclic structure or a structure linked by a single bond.

For example, the tetracarboxylic dianhydride may include a tetravalent organic group having structures of Chemical Formulas 6a to 6e:

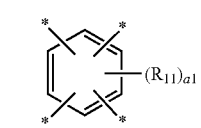

[Chemical Formula 6a]

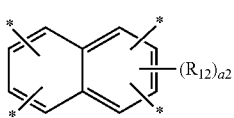

[Chemical Formula 6b]

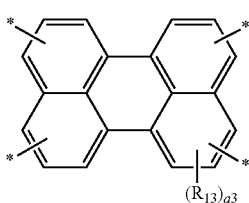

[Chemical Formula 6c]

-continued

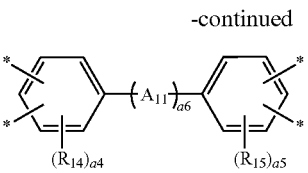

[Chemical Formula 6d]

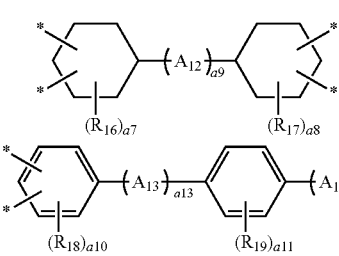

[Chemical Formula 6e]

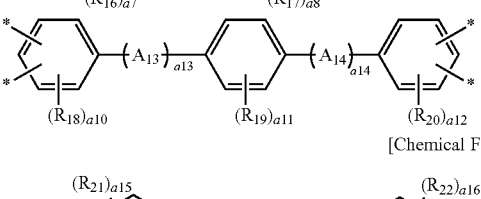

[Chemical Formula 6g]

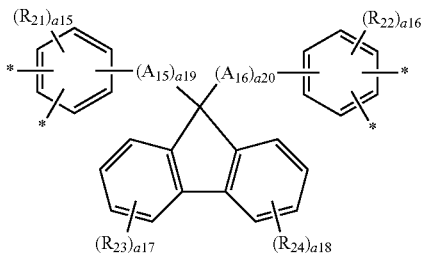

[Chemical Formula 6h]

in Chemical Formulas 6a to 6h, $R_{11}$ to $R_{24}$ may be each independently selected from a halogen atom selected among —F, —Cl, —Br and —I, a hydroxyl group (—OH), a thiol group (—SH), a nitro group (—$NO_2$), a cyano group, an alkyl group having 1 to 10 carbon atoms, a halogenoalkoxy having 1 to 4 carbon atoms, a halogenoalkyl group having 1 to 10 carbon atoms, and an aryl group having 6 to 20 carbon atoms, a1 is an integer of 0 to 2, a2 is an integer of 0 to 4, a3 is an integer of 0 to 8, a4 and a5 are each independently an integer of 0 to 3, a6 and a9 are each independently an integer of 0 to 3, and a7 and a8 may be each independently an integer of 0 to 7, a10 and a12 are each independently an integer of 0 to 3, a11 is an integer of 0 to 4, a15 and a16 are each independently an integer of 0 to 4, a17 and a18 are each independently an integer of 0 to 4, a6, a9, a13, a14, a19, and a20 are each independently an integer of 0 to 3, and n is an integer of 1 to 3, $A_{11}$ to $A_{16}$ may be each independently selected from the group consisting of a single bond, —O—, —CR'R"—, —C(=O)—, —C(=O)NH—, —S—, —$SO_2$—, a phenylene group and a combination thereof, where the R' and R" may be each independently selected from the group consisting of a hydrogen atom, an alkyl group having 1 to 10 carbon atoms and a fluoroalkyl group having 1 to 10 carbon atoms.

Alternatively, the tetracarboxylic dianhydride may include a tetravalent organic group selected from the group consisting of the following Chemical Formulas 7a to 7n.

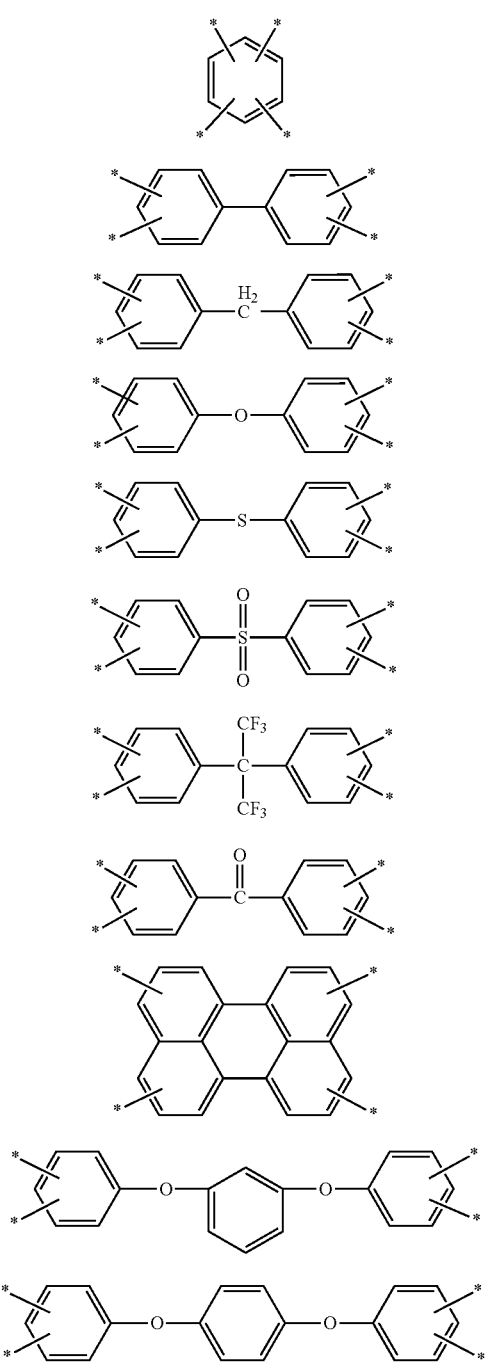

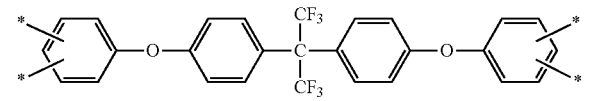

(7l)

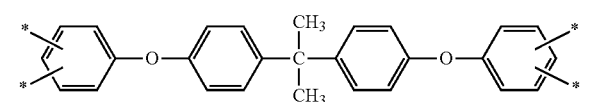

(7m)

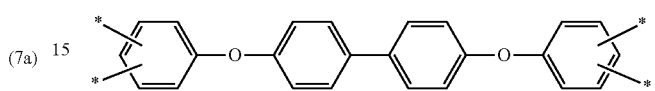

(7n)

At least one hydrogen atom in the tetravalent organic group of Chemical Formulas 7a to 7n may be substituted with a substituent selected from a halogen atom selected from —F, —Cl, —Br and —I, a hydroxyl group (—OH), a thiol group (—SH), a nitro group (—$NO_2$), a cyano group, an alkyl group having 1 to 10 carbon atoms, a halogenoalkoxy group having 1 to 4 carbon atoms, a halogenoalkyl group having 1 to 10 carbon atoms, or an aryl group having 6 to 20 carbon atoms. For example, the halogen atom may be fluoro (—F), the halogenoalkyl group is a fluoroalkyl group having 1 to 10 carbon atoms containing a fluoro atom and may be selected from a fluoromethyl group, a perfluoroethyl group, a trifluoromethyl group, or the like, the alkyl group may be selected from a methyl group, an ethyl group, a propyl group, an isopropyl group, a t-butyl group, a pentyl group, or a hexyl group, and the aryl group may be selected from a phenyl group and a naphthalenyl group, or may be a substituent including a fluoro atom such as a fluoro atom and a fluoroalkyl group.

The diamine may be selected from the group consisting of a monocyclic or polycyclic aromatic divalent organic group having 6 to 24 carbon atoms, a monocyclic or polycyclic alicyclic divalent organic group having 6 to 18 carbon atoms, or a divalent organic group containing a structure in which two or more of them are linked by a single bond or a functional group, or the cyclic compound such as an aromatic or alicyclic compound may be one selected from a divalent organic group having a rigid structure, such as a single or fused heterocyclic ring structure, or a structure linked by a single bond.

For example, it may include a divalent organic group selected from the following Chemical Formulas 8a to 8e.

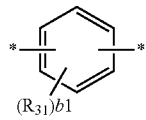

[Chemical Formula 8a]

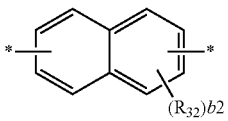

[Chemical Formula 8b]

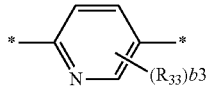

[Chemical Formula 8c]

[Chemical Formula 8d]

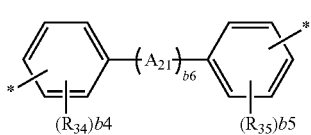

[Chemical Formula 8e]

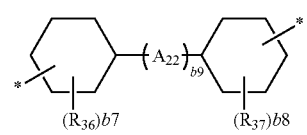

in Chemical Formulas 8a to 8e,
R$_{31}$ to R$_{37}$ may be each independently selected from the group consisting of a halogen atom selected from —F, —Cl, —Br and —I, a hydroxyl group (—OH), a thiol group (—SH), a nitro group (—NO$_2$), a cyano group, an alkyl group having 1 to 10 carbon atoms, a halogenoalkoxy having 1 to 4 carbon atoms, a halogenoalkyl having 1 to 10 carbon atoms, or an aryl group having 6 to 20 carbon atoms, A$_{21}$ and A$_{22}$ may be each independently selected from a single bond, —O—, —CR'R''— (where R' and R'' may be each independently selected from a hydrogen atom, an alkyl group having 1 to 10 carbon atoms (e.g., methyl group, ethyl group, propyl group, isopropyl group, n-butyl group, tert-butyl group, pentyl group, etc.) and a haloalkyl group having 1 to 10 carbon atoms (e.g., selected from trifluoromethyl group, etc.), —C(=O)—, —C(=O)O—, —C(=O)NH—, —S—, —SO—, —SO$_2$—, —O[CH$_2$CH$_2$O]$_y$— (where y is an integer of 1 to 44), —NH(C=O)NH—, —NH(C=O)O—, a monocyclic or polycyclic cycloalkylene group having 6 to 18 carbon atoms (e.g., cyclohexylene group, etc.), a monocyclic or polycyclic arylene group having 6 to 18 carbon atoms (e.g., phenylene group, naphthalene group, fluorenylene group, etc.), and a combination thereof, b1 is an integer of 0 to 4, b2 is an integer of 0 to 6, b3 is an integer of 0 to 3, b4 and b5 are each independently an integer of 0 to 4, b7 and b8 are each independently an integer of 0 to 9, and b6 and b9 are each independently an integer of 0 to 3.

Alternatively, the diamine may include a divalent organic group selected from the group consisting of the following Formulas 9a to 9p.

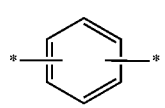

(9a)

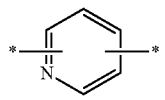

(9b)

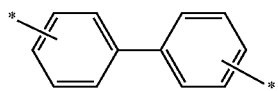

(9c)

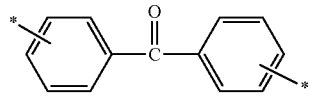

(9d)

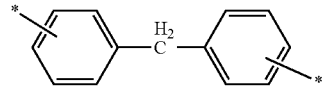

(9e)

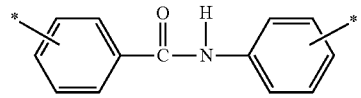

(9f)

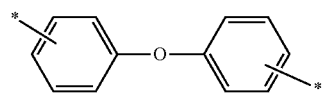

(9g)

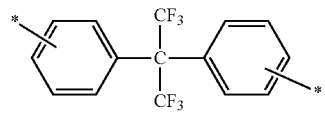

(9h)

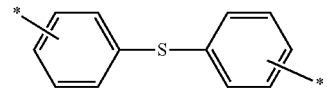

(9i)

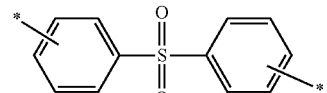

(9j)

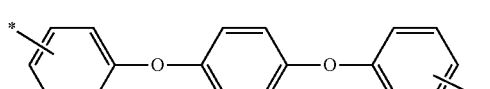

(9k)

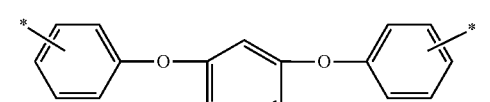

(9l)

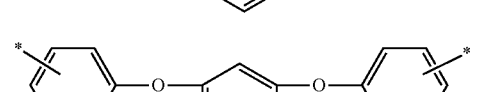

(9m)

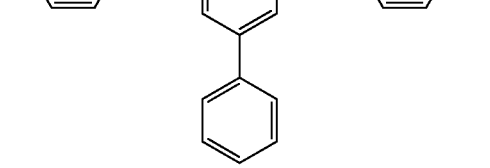

(9n)

(9o)

(9p)

One or more hydrogen atoms in the divalent organic group of Chemical Formulas 9a to 9p may be substituted with a substituent selected from a halogen atom selected from —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms, and an aryl group having 6 to 20 carbon atoms. For example, the halogen atom may be fluoro (—F), the halogenoalkyl group is a fluoroalkyl group having 1 to 10 carbon atoms containing a fluoro atom, and may be selected from a fluoromethyl group, a perfluoroethyl group, a trifluoromethyl group, the alkyl group may be selected from a methyl group, an ethyl group, a propyl group, an isopropyl group, a t-butyl group, a pentyl group, a hexyl group, and the aryl group may be selected from a phenyl group, and a naphthalenyl group, or may be a substituent including a fluoro atom such as a fluoro atom and a fluoroalkyl group.

According to one embodiment of the present disclosure, the total content of the tetracarboxylic dianhydride and the content of the diamine may be reacted in a molar ratio of 1:1.1 to 1.1:1, or in order to improve reactivity and processability, it is preferred that the total content of the tetracarboxylic dianhydride is reacted in excess relative to the diamine, or the content of the diamine is reacted in excess relative to the total content of the tetracarboxylic dianhydride.

According to one embodiment of the present disclosure, it is preferred that the molar ratio between the total content of the tetracarboxylic dianhydride and the content of the diamine may be 1:0.98 to 0.98:1, or 1:0.99 to 0.99:1.

Organic solvents that can be used in the polymerization reaction of the polyamic acid include ketones such as gamma-butyrolactone, 1,3-dimethyl-2-imidazolidinone, methyl ethyl ketone, cyclohexanone, cyclopentanone, or 4-hydroxy-4-methyl-2-pentanone; aromatic hydrocarbons such as toluene, xylene or tetramethylbenzene; glycol ethers (cellosolve) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether, or triethylene glycol monoethyl ether; ethyl acetate, butyl acetate, ethylene glycol monoethyl ether acetate, ethylene glycol monobutyl ether acetate, diethylene glycol monoethyl ether acetate, dipropylene glycol monomethyl ether acetate, ethanol, propanol, ethylene glycol, propylene glycol, carbitol, dimethylpropionamide (DMPA), diethylpropionamide (DEPA), dimethylacetamide (DMAc), N,N-diethylacetamide, dimethylformamide (DMF), diethylformamide (DEF), N-methylpyrrolidone (NMP), N-ethylpyrrolidone (NEP), N,N-dimethylmethoxyacetamide, dimethyl sulfoxide, pyridine, dimethyl sulfone, hexamethylphosphoramide, tetramethylurea, N-methylcaprolactam, tetrahydrofuran, m-dioxane, p-dioxane, 1,2-dimethoxyethane, bis(2-methoxyethyl)ether, 1,2-bis(2-methoxyethoxy)ethane, bis[2-(2-methoxyethoxy)] ether, Equamide M100, Equamide B100, etc., and among these, one type alone or a mixture of two or more types can be used.

For example, the organic solvent that can be used for the polymerization reaction of the diamine and the acid dianhydride may include a solvent having a positive distribution coefficient (LogP value) at 25° C., and the organic solvent may have a boiling point of 300° C. or less. More specifically, the distribution coefficient LogP value may be 0.01 to 3, or 0.01 to 2, or 0.1 to 2.

The distribution coefficient may be calculated using an ACD/LogP module of ACD/Percepta platform from ACD/Labs. The ACD/LogP module uses an algorithm based on QSPR (Quantitative Structure-Property Relationship) methodology using 2D molecular structures.

The solvent having a positive distribution coefficient (Log P) may be an amide-based solvent. The amide-based solvent may be at least one selected from the group consisting of dimethylpropionamide (DMPA), diethylpropionamide (DEPA), N,N-diethylacetamide (DEAc), N,N-diethylformamide (DEF) and N-ethylpyrrolidone (NEP).

The method for reacting the tetracarboxylic dianhydride with diamine can be performed according to a conventional method for preparing a polyimide precursor such as solution polymerization. Specifically, it can be prepared by dissolving diamine in an organic solvent, and then adding tetracarboxylic dianhydride to the resulting mixed solution to cause a polymerization reaction.

The polymerization reaction can be performed under an inert gas or nitrogen stream, and can be carried out under anhydrous conditions.

In addition, the reaction temperature at the time of the polymerization reaction may be −20° C. to 80° C., or 0° C. to 80° C. If the reaction temperature is too high, the reactivity may increase, the molecular weight may increase, and the viscosity of the precursor composition is increased, which may be disadvantageous in terms of process.

It is preferred that the polyamic acid solution prepared according to the above preparation method includes a solid in such an amount that the composition has an appropriate viscosity in consideration of processability such as a coating property during the film forming process.

The polyimide precursor composition containing the polyamic acid may be in the form of a solution dissolved in an organic solvent. In the case of having such form, for example, when the polyimide precursor is synthesized in the organic solvent, the solution may be the reaction solution thus obtained itself or a solution obtained by diluting the reaction solution with another solvent. Further, when the polyimide precursor is obtained as powder, the solution may be a solution obtained by dissolving the powder in an organic solvent. For example, in the polymerization reaction, an organic solvent having a positive LogP may be used, and an organic solvent having a negative LogP may be used as an organic solvent to be mixed later.

According to one embodiment, the content of the composition may be adjusted so that the total content of the polyimide precursor is 8% by weight to 25% by weight, or may be adjusted to 10% by weight to 25% by weight, or 10% by weight to 20% by weight or less.

Alternatively, the polyimide precursor composition may be adjusted to have a viscosity of 3,000 cP or more, or 4,000 cP or more. The viscosity of the polyimide precursor composition is 10,000 cP or less, or 9,000 cP or less, or 8,000 cP or less. When the viscosity of the polyimide precursor composition exceeds 10,000 cP, the efficiency of defoaming during processing the polyimide film is lowered. It results in not only a reduction in the efficiency of process but also a deterioration in the surface roughness of the produced film due to bubble generation. It may lead to the deterioration of electrical, optical and mechanical properties.

Further, the polyimide according to the present disclosure may have a weight average molecular weight of 10,000 g/mol to 200,000 g/mol, or 20,000 g/mol to 100,000 g/mol, or 30,000 g/mol to 100,000 g/mol.

Moreover, the molecular weight distribution (Mw/Mn) of the polyimide according to the present disclosure is preferably 1.1 to 2.5. When the weight average molecular weight or the molecular weight distribution of the polyimide is out of the above range, the film formation may be difficult or the properties of polyimide film such as transmittance, heat resistance and mechanical properties may be deteriorated.

Next, the obtained polyimide precursor as a result of the polymerization reaction can be imidized to prepare a transparent polyimide film.

According to one embodiment, the polyimide film composition obtained as above can be prepared by a method including the steps of:

coating the polyimide film composition onto a substrate; and heating and curing the coated polyimide film composition.

At this time, as the substrate, a glass, a metal substrate or a plastic substrate may be used without particular limitation. Among them, a glass substrate that is excellent in thermal and chemical stability during imidization and curing process for the polyimide precursor, and which can be easily separated without damage to the polyimide film formed after curing even without a separate release agent treatment, may be preferable.

In addition, the coating step may be performed according to a conventional coating method. Specific examples of spin coating methods may include a bar coating method, a roll coating method, an air-knife method, a gravure method, a reverse roll method, a kiss roll method, a doctor blade method, a spray method, a dipping method, a brushing method and the like. Among these, it may be more desirable to carry out the process by a casting method which can not only enable a continuous process but also increase the imidization rate of the polyimide.

Further, the polyimide precursor composition may be coated onto the substrate in a thickness range such that the finally produced polyimide film has a thickness suitable for a display substrate.

Specifically, it may be coated in such an amount to have a thickness is 10 μm to 30 μm. After the coating of the polyimide precursor composition, a drying step for removing a solvent present in the polyimide precursor composition may be further performed, if necessary, before the curing step.

The drying step may be performed according to a conventional method, and specifically, it may be performed at a temperature of 140° C. or less, or 80° C. to 140° C. When the temperature of a drying step is less than 80° C., a drying step will become longer, and when it exceeds 140° C., imidization proceeds rapidly, and it is difficult to form a polyimide film having a uniform thickness.

Next, the polyimide precursor composition is coated onto a substrate, and heat treated on an IR oven, a hot air oven, or a hot plate. At this time, the heat treatment temperature may be in a temperature range of 280° C. to 500° C., or 300° C. to 450° C., and the heat treatment may be performed in multiple stages within the above temperature range. The heat treatment step may be performed for 20 minutes to 70 minutes, or may be performed for about 20 minutes to 60 minutes.

Thereafter, the polyimide film can be produced by peeling the polyimide film formed on a substrate from the substrate according to a conventional method.

That is, the polyimide film may include a cured product of the polyimide precursor composition. The cured product means a material obtained through a curing step of the polyimide precursor composition, and the curing step may be performed at a temperature of 200° C. or more, or 200° C. or more and 350° C. or less. Therefore, the polyimide film may include a cured product of the polyimide precursor composition cured at a temperature of 200° C. or more, or 200° C. or more and 350° C. or less.

According to one embodiment, the polyimide film may have a refractive index in the in-plane direction (TE) of 1.75 or more, or 1.75 or more and 1.8 or less at a wavelength of 532 nm. In addition, the polyimide film may have a refractive index in the thickness direction (TM) of 1.5 or more, or 1.53 or more, or 1.5 or more and 1.6 or less, or 1.53 or more and 1.6 or less at a wavelength of 532 nm.

Examples of the method of measuring the refractive index are not particularly limited, but for example, the refractive index may be measured at a wavelength of 532 nm using a prism coupler.

The refractive index may be measured from the polyimide film sample having a thickness of 10±2 μm. When the thickness of the polyimide film increases or decreases by a specific value, the physical properties measured in the polyimide film may also change by a certain value.

Therefore, the polyimide film according to the present disclosure can increase the refractive index, can be used as a substrate layer in the flexible display device, and can reduce the difference in refractive index with each layer constituting the device, from which the amount of light internally dissipated is reduced and the efficiency of bottom emission can be effectively increased.

The coefficient of thermal expansion (CTE) of the polyimide film according to the present disclosure may be measured at 100° C. or more and 350° C. or less, and the CTE measured in the above region may be −5 ppm/° C. or more and +15 ppm/° C. or less, or −5 ppm/° C. or more and +5 ppm/° C. or less.

The coefficient of thermal expansion is obtained by measuring the aspect of the change in thermal expansion using TMA (Q400, TA Instruments) at the time when setting a force pulling the polyimide film sample at 0.01N or more and 0.1N or less, or 0.01N or more and 0.05N or less, performing a primary heating step at a heating rate of 1° C./min or more and 10° C./min or less in a temperature range of 100° C. or more and 350° C. or less, or 4° C./min or more and 6° C./min or less, and then performing a cooling at a cooling rate of 1° C./min or more and 10° C./min or less, or 3° C./min or more and 5° C./min or less in a temperature range from 350° C. to 100° C.

As the coefficient of thermal expansion of the polyimide film over the range of 100° C. or more and 350° C. or less satisfies the above range, it can ensure sufficient heat resistance even in the polyimide film, and when this is used as a plastic substrate, it can prevent the plastic substrate from being damaged by heat at the time of heat treating the metal layer formed on the plastic substrate, and also can suppress the occurrence of warpage of a metal thin film formed on the plastic substrate.

The coefficient of thermal expansion may be measured from the polyimide film sample having a thickness of 10±2 μm. When the thickness of the polyimide film increases or decreases by a specific value, the physical properties measured from the polyimide film may also change by a certain value.

The thermal decomposition temperature (Td_1%) of the polyimide film according to the present disclosure may be 539° C. or more, or 539° C. or more and 545° C. or less. Examples of the method of measuring the thermal decomposition temperature (Td_1%) are not particularly limited, but for example, it can be measured in a nitrogen atmosphere using TGA. The thermal decomposition temperature may be measured from the polyimide film sample having a thickness of 10±2 μm. When the thickness of the polyimide film increases or decreases by a specific value, the physical properties measured in the polyimide film may also change by a certain value.

Therefore, the present disclosure can provide a polyimide film with significantly improved heat resistance by using the diamine of Chemical Formula 1.

The transmittance of the polyimide film at a wavelength of 450 nm measured based on JIS K 7105 may be 75% or more, or 75% or more and 85% or less. Examples of the method of measuring the transmittance are not particularly limited, but for example, the transmittance in a wavelength range of 450 nm can be measured with a transmittance meter (model name: HR-100, manufactured by Murakami Color Research Laboratory) based on JIS K 7105.

The transmittance may be measured from the polyimide film sample having a thickness of 10±2 μm. When the thickness of the polyimide film increases or decreases by a specific value, the physical properties measured in the polyimide film may also change by a certain value.

Meanwhile, according to another embodiment of the present disclosure, there can be provided a substrate for display device including the polyimide film. Details of the polyimide film may include all of the contents described above in the one embodiment.

The display device including the substrate may include a liquid crystal display device (LCD), an organic light emitting diode (OLED), a flexible display, a rollable display or foldable display, or the like.

The display device may have various structures according to an application field and a specific shape, and may have structures including, for example, a cover plastic window, a touch panel, a polarizing plate, a barrier film, a light emitting device (such as an OLED device), a transparent substrate, or the like.

The polyimide film of another embodiment described above may be used in various applications such as a substrate, an outer protective film or a cover window in such various display devices, and more specifically, may be applied to a substrate.

For example, the substrate for display device may have a structure in which a device protective layer, a transparent electrode layer, a silicon oxide layer, a polyimide resin film, a silicon oxide layer, and a hard coating layer are sequentially stacked.

The transparent polyimide substrate may further include a silicon oxide layer formed between the transparent polyimide resin film and the cured layer in order to further improve the solvent resistance, water permeability and optical properties thereof, and the silicon oxide layer may be produced by curing polysilazane.

Specifically, the silicon oxide layer may, before forming a coating layer on at least one surface of the transparent polyimide resin film, be formed by curing the coated polysilazane after coating and drying a solution containing polysilazane.

The substrate for a display device according to the present disclosure can provide a transparent polyimide cover substrate having solvent resistance, optical properties, water permeability and scratch resistance while having excellent warpage properties and impact resistance by including the above-described device protective layer.

Meanwhile, according to another embodiment of the present disclosure, there can be provided an optical device including the polyimide film. Details of the polyimide film may include all of those described above in the one embodiment.

The optical device may include all kinds of devices using properties realized by light, and may be, for example, a display device. Specific examples of the display device include a liquid crystal display device (LCD), an organic light emitting diode (OLED), a flexible display, a rollable display or foldable display device, or the like, but is not limited thereto.

The optical device may have various structures according to the application field and the specific shape, and for example, it may have a structure including a cover plastic window, a touch panel, a polarizing plate, a barrier film, a light emitting device (such as an OLED device), a transparent substrate, or the like.

The polyimide film of another embodiment described above may be used in various applications such as a substrate, an outer protective film or a cover window in various optical devices, and more specifically, may be applied to a substrate.

Examples of the present disclosure will be described in detail so that those skilled in the art may easily implement the present disclosure. The present disclosure may be modified in various different ways, and is not limited to the examples described herein.

Comparative Example 1

The organic solvent DEAc was filled in a reactor under a stream of nitrogen, and then 0.821 mol of TFMB (2,2'-bis (trifluoromethyl)benzidine) was added and dissolved at the same temperature while maintaining the reactor temperature at 25° C. 0.821 mol of PMDA was added to the TFMB-added solution at the same temperature and stirred for 24 hours to obtain a polyimide precursor composition.

Comparative Example 2

The organic solvent DEAc was filled in a reactor under a stream of nitrogen, and then 0.902 mol of TFMB (2,2'-bis (trifluoromethyl)benzidine) was added and dissolved at the same temperature while maintaining the reactor temperature at 25° C. 0.902 mol of BPDA was added to the TFMB-added solution at the same temperature and stirred for 24 hours to obtain a polyimide precursor composition.

Comparative Example 3

The organic solvent DEAc was filled in a reactor under a stream of nitrogen, and then 0.793 mol of diamine of Chemical Formula 1 was added and dissolved at the same temperature while maintaining the reactor temperature at 25° C. 0.793 mol of PMDA was added to the diamine of Chemical Formula 1-added solution at the same temperature and stirred for 24 hours to obtain a polyimide precursor composition.

Comparative Example 4

The organic solvent DEAc was filled in a reactor under a stream of nitrogen, and then 0.3965 mol of diamine of Chemical Formula 1 and 0.3965 mol of TFMB (2,2'-bis (trifluoromethyl)benzidine) were added and dissolved at the same temperature while maintaining the reactor temperature at 25° C. 0.6344 mol of 6-FDA and 0.1586 mol of PMDA were added to the diamine of Chemical Formula 1 and TFMB-added solution at the same temperature and stirred for 24 hours to obtain a polyimide precursor composition.

Example 1

The organic solvent DEAc was filled in a reactor under a stream of nitrogen, and then 0.735 mol of diamine of Chemical Formula 1 was added and dissolved at the same temperature while maintaining the reactor temperature at 25° C. 0.735 mol of BPDA was added to the diamine of Chemical Formula 1-added solution at the same temperature and stirred for 24 hours to obtain a polyimide precursor composition.

Example 2

The organic solvent DEAc was filled in a reactor under a stream of nitrogen, and then 0.668 mol of diamine of Chemical Formula 1 and 0.067 mol of diamine of Chemical Formula 4-1 were added and dissolved at the same temperature while maintaining the reactor temperature at 25° C. 0.735 mol of BPDA was added to the diamines of Chemical Formulas 1 and 4-1 added solution at the same temperature and stirred for 24 hours to obtain a polyimide precursor composition.

[Chemical Formula 4-1]

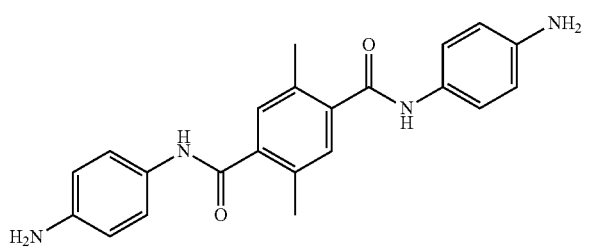

Example 3

The organic solvent DEAc was filled in a reactor under a stream of nitrogen, and then 0.668 mol of diamine of Chemical Formula 1 and 0.067 mol of diamine of Chemical Formula 4-2 were added and dissolved at the same temperature while maintaining the reactor temperature at 25° C. 0.735 mol of BPDA was added to the diamines of Chemical Formulas 1 and 4-2 added solution at the same temperature and stirred for 24 hours to obtain a polyimide precursor composition.

[Chemical Formula 4-2]

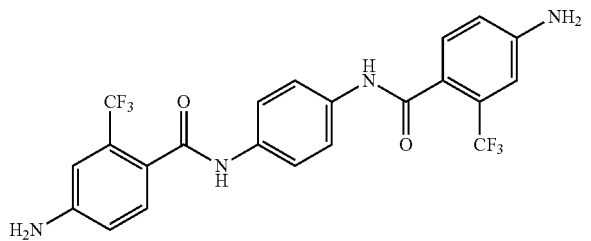

Example 4

The organic solvent DEAc was filled in a reactor under a stream of nitrogen, and then 0.668 mol of diamine of Chemical Formula 1 and 0.067 mol of diamine of Chemical Formula 4-3 were added and dissolved at the same temperature while maintaining the reactor temperature at 25° C. 0.735 mol of BPDA was added to the diamines of Chemical Formulas 1 and 4-3 added solution at the same temperature and stirred for 24 hours to obtain a polyimide precursor composition.

[Chemical Formula 4-3]

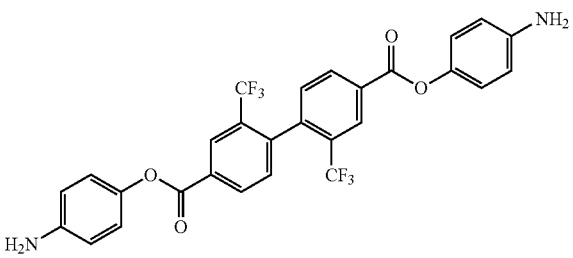

Experimental Example 1

Each of the polyimide precursor compositions prepared in Examples 1 to 4 and Comparative Examples 1 to 3 was spin coated on a glass substrate. The polyimide precursor composition-coated glass substrate was put in an oven and heated at a rate of 5° C./min, and a curing process was performed by maintaining at 80° C. for 30 minutes and at 300° C. for 30 minutes, thereby preparing a polyimide film.

Physical properties of each film were measured and shown in Table 1 below.

<Measurement of Transmittance>

The transmittance in a 450 nm wavelength was measured with a transmittance meter (model name HR-100, Murakami Color Research Laboratory) based on JIS K 7105.

<Measurement of Refractive Index>

The prepared polyimide film was peeled off and the refractive index was measured at a wavelength of 532 nm using a prism coupler.

<Pyrolysis Temperature (Td1%)>

The temperature at which the weight loss rate of the polymer was 1% in a nitrogen atmosphere was measured using TGA.

<Coefficient of Thermal Expansion (CTE) and Glass Transition Temperature (Tg)>

The film was prepared in a size of 5×20 mm and then a sample was loaded using an accessory. A length of the film to be actually measured was set to be equal to 16 mm. A force pulling the film was set at 0.02N, A primary heating step was performed at a heating rate of 5° C./min in a temperature range of 100° C. or more and 350° C. or less, and then cooling was performed at a cooling rate of 4° C./min in a temperature range from 350° C. to 100° C. The aspect of the change in thermal expansion was measured using TMA (Q400, TA Instruments).

TABLE 1

| Sample | Curing condition | Transmittance (%) 450 nm | Thickness (μm) | Refractive index (532 nm) In-plane direction (TE) | Refractive index (532 nm) Thickness direction (TM) | CTE (ppm/°C.) | Td_1% (°C.) |
|---|---|---|---|---|---|---|---|
| Comparative Example 1 (PMDA-TFMB) | 300° C. | 72 | 11.01 | 1.6649 | 1.5117 | −6.504 | 523 |
| Comparative Example 2 (BPDA-TFMB) | 300° C. | 80 | 8.47 | 1.6748 | 1.5077 | 29.09 | 545 |
| Comparative Example 3 (PMDA-Formula 1) | 300° C. | 61 | 11.01 | 1.7171 | 1.5421 | −8.114 | 521 |
| Comparative Example 4 (6FDA/PMDA-Formula 1/TFMB) | 300° C. | 67 | 10.81 | 1.691 | 1.528 | 18.19 | 519 |
| Example 1 (BPDA-Formula 1) | 300° C. | 82 | 8.32 | 1.7733 | 1.5426 | −3.854 | 542 |
| Example 2 (BPDA-Formula 1/Formula 4-1) | 300° C. | 80 | 8.35 | 1.7596 | 1.5483 | −0.25 | 539 |
| Example 3 (BPDA-Formula 1/Formula 4-2) | 300° C. | 79 | 9.01 | 1.7672 | 1.5635 | −2.31 | 542 |
| Example 4 (BPDA-Formula 1/Formula 4-3) | 300° C. | 83 | 8.56 | 1.7601 | 1.5593 | 3.41 | 541 |

From the results in Table 1, it can be seen that the polyimide film according to the present disclosure shows a high refractive index in the in-plane direction, and the refractive index can be significantly improved compared to the polyimide film of the other comparative example. In addition, the polyimide film according to the present disclosure shows a low CTE value, which may mean that the shrinkage behavior or change of the film due to heating is very small, from which it can be seen that the polyimide film according to the present disclosure has excellent heat resistance.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

The invention claimed is:

1. A polyimide precursor composition comprising, as polymerization components,
   one or more diamines including a diamine of Chemical Formula 1; and
   one or more acid dianhydrides including a tetracarboxylic dianhydride of Chemical Formula 2:

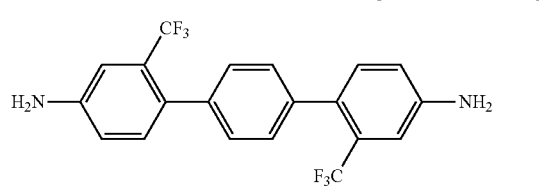

[Chemical Formula 1]

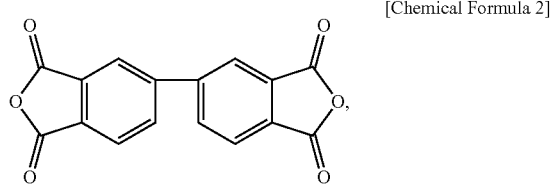

[Chemical Formula 2]

wherein the diamine of Chemical Formula 1 is included in an amount of 70 mol % or more with respect to the total content of the diamines.

2. The polyimide precursor composition of claim 1, wherein the polymerization components further include a diamine of Chemical Formula 4:

[Chemical Formula 4]

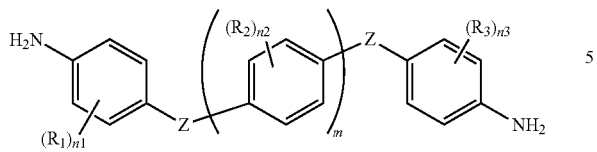

in the Chemical Formula 4,

[Chemical Formula 5]

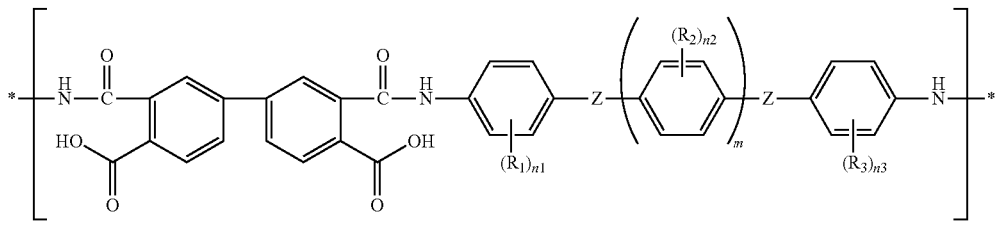

each Z is independently one selected from —CONH, —NHCO—, —C(=O)O— and —OC(=O), $R_1$, $R_2$ and $R_3$ are each independently selected from a substituted or unsubstituted alkyl group having 1 to 10 carbon atoms, a haloalkyl group having 1 to 10 carbon atoms, an alkenyl group having 2 to 10 carbon atoms and an aryl group having 6 to 18 carbon atoms, n1, n2 and n3 are each independently an integer of 0 to 4, and m is an integer of 1 to 3.

3. The polyimide precursor composition of claim 1, wherein the diamine of Chemical Formula 1 is included in an amount of 80 mol % or more with respect to the total content of the diamines.

4. The polyimide precursor composition of claim 1, wherein the tetracarboxylic dianhydride of Chemical Formula 2 is included in an amount of 70 mol % or more with respect to the total content of the acid dianhydrides.

5. The polyimide precursor composition of claim 1, wherein a polyamic acid contained in the polyimide precursor composition includes the repeating structure of Chemical Formula 3 in an amount of 70 mol % or more with respect to the total content of the entire repeating structures:

[Chemical Formula 3]

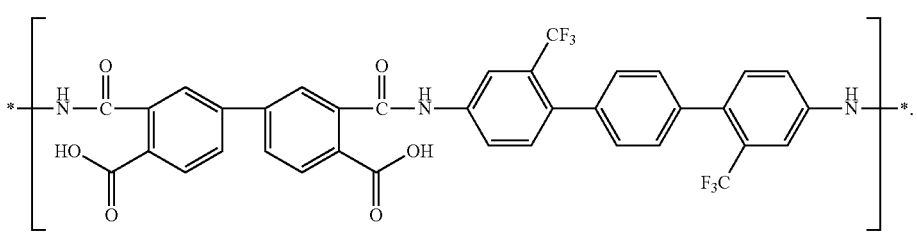

6. The polyimide precursor composition of claim 2, wherein the diamine of Chemical Formula 4 is included in an amount of more than 0 and 30 mol % or less with respect to the total content of the diamines.

7. The polyimide precursor composition of claim 1, wherein a polyamic acid contained in the polyimide precursor composition includes a repeating structure of Chemical Formula 5:

in the Chemical Formula 5, each Z is independently one selected from —CONH, —NHCO—, —C(=O)O— and —OC(=O), $R_1$, $R_2$ and $R_3$ are each independently selected from a substituted or unsubstituted alkyl group having 1 to 10 carbon atoms, a haloalkyl group having 1 to 10 carbon atoms, an alkenyl group having 2 to 10 carbon atoms and an aryl group having 6 to 18 carbon atoms, n1, n2 and n3 are each independently an integer of 0 to 4, and m is an integer of 1 to 3.

8. A polyimide film comprising a cured product of the polyimide precursor composition according to claim 1.

9. A method for preparing a polyimide film comprising the steps of:
coating the polyimide precursor composition according to claim 1 onto a carrier substrate; and
heating and curing the coated polyimide precursor composition.

10. The polyimide film of claim 8, wherein the polyimide film has a refractive index in the in-plane direction of at least 1.75 at a wavelength of 532 nm.

11. The polyimide film of claim 8, wherein the polyimide film has a transmittance at a wavelength of 450 nm of at least 75% as measured according to JIS K 7105.

12. The polyimide film of claim 8, wherein the polyimide film has a CTE of −5 ppm/° C. or more and +15 ppm/° C. or less.

13. A substrate for display device comprising the polyimide film of claim 8.

14. An optical device comprising the polyimide film of claim 8.

* * * * *